INVENTORS
ARTHUR E. WATSON
BY FRED K. BARNS
C. E. Tripp
ATTY.

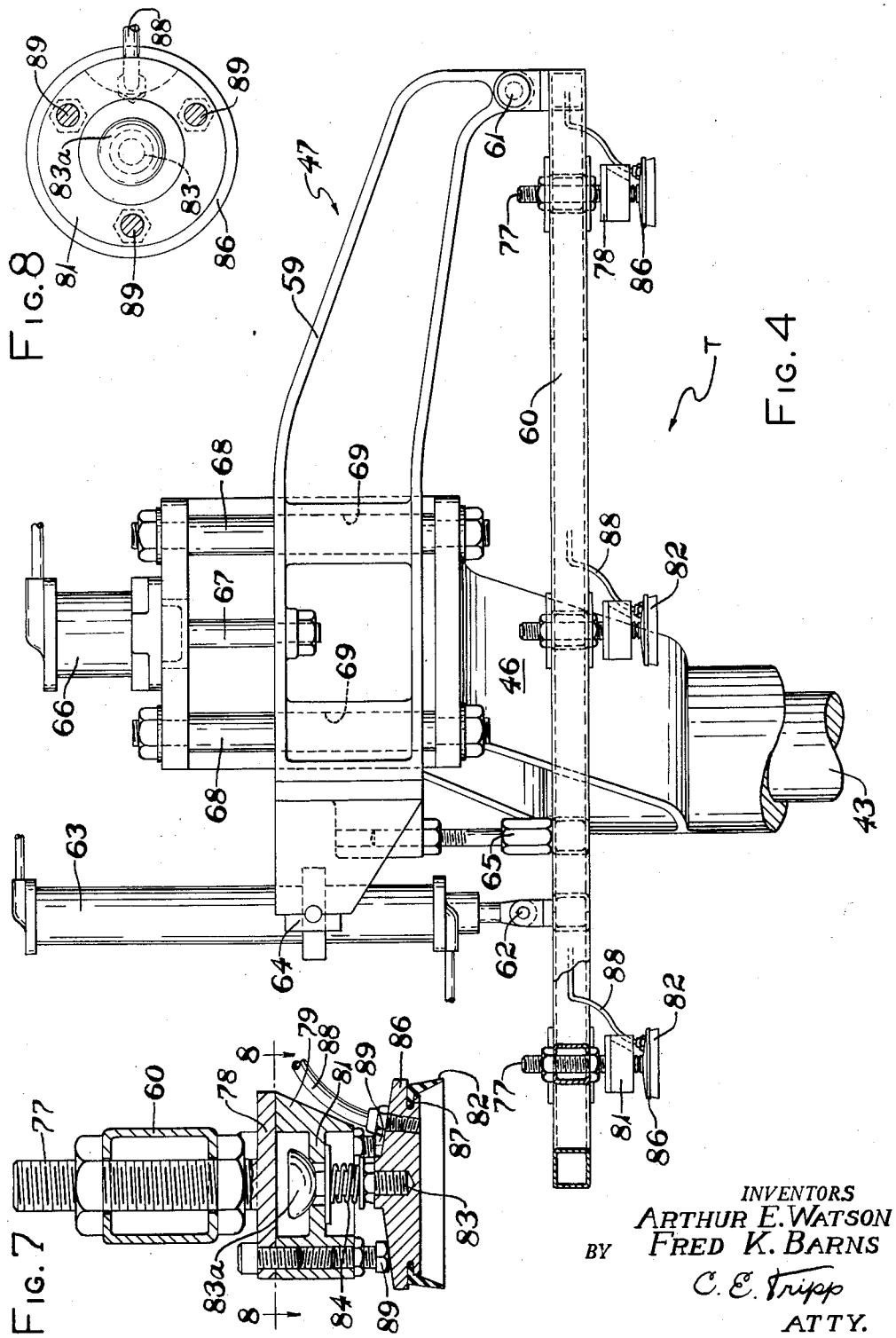

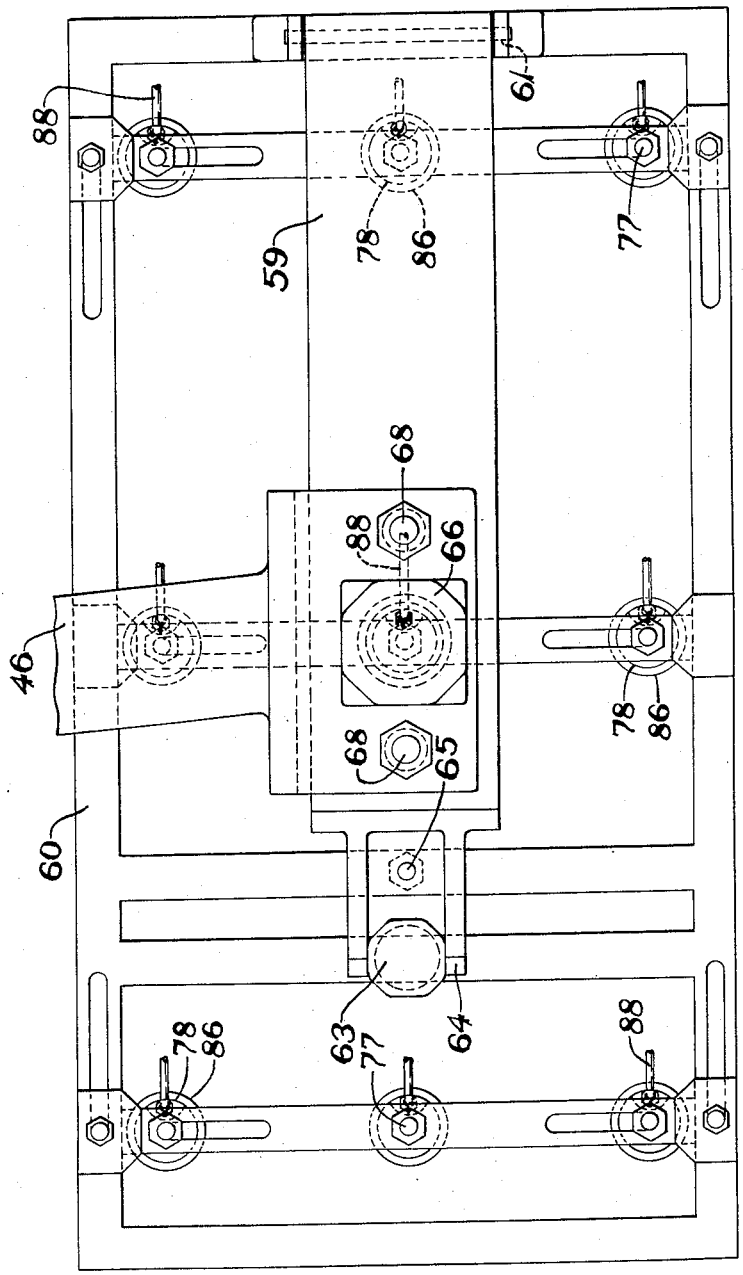

Sept. 1, 1959 A. E. WATSON ET AL 2,902,082
TIRE TREAD TRANSFER APPARATUS
Filed June 26, 1957 6 Sheets-Sheet 6
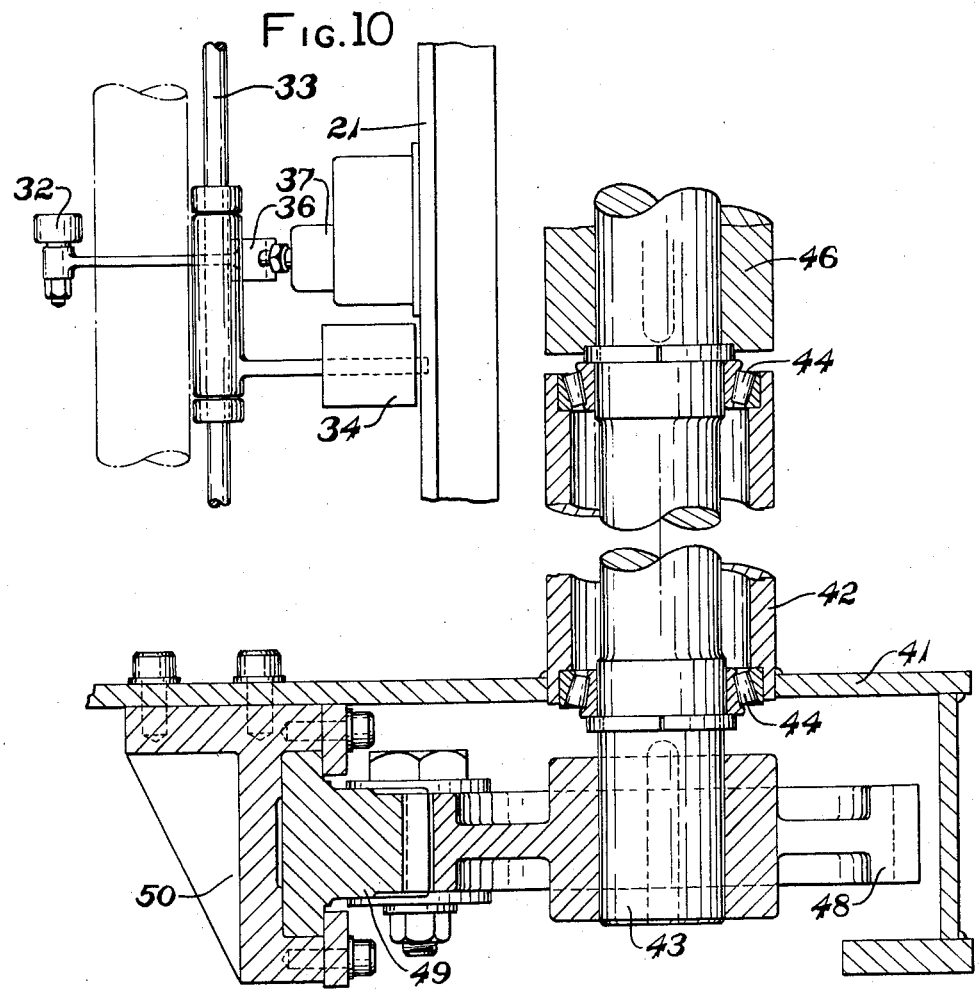
FIG. 10
FIG. 6
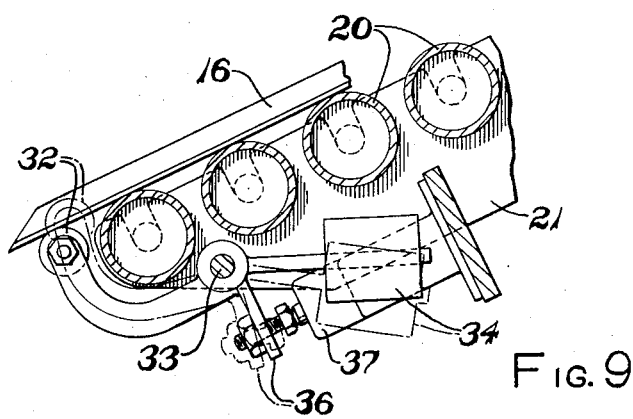
FIG. 9
INVENTORS
ARTHUR E. WATSON
BY FRED K. BARNS
C. E. Tripp
ATTY.

United States Patent Office 2,902,082
Patented Sept. 1, 1959

2,902,082
TIRE TREAD TRANSFER APPARATUS

Arthur E. Watson, Lancaster, and Fred K. Barns, Akron, Ohio, assignors to The B. F. Goodrich Company, New York, N.Y., a corporation of New York Application June 26, 1957, Serial No. 668,056

7 Claims. (Cl. 154—9)

This invention relates to a tire building apparatus, and more specifically to an apparatus for transferring an extruded length of tread rubber stock from one conveyor, running in one plane to another conveyor, which is the tread applying conveyor that runs in another plane.

This invention is particularly useful in connection with the station to station type of automatic tire building machine as described in the patent to Sternad et al. 2,319,643 assigned to The B. F. Goodrich Company. Machines of this type include a plurality of aligned building stations, each one of which mounts a tire building drum, there being an operation performed in each station with the drums and the partially finished tire carcass thereon successively transferred from station to station.

The apparatus of this invention is employed at the station wherein the extruded length of tread rubber is applied to the carcass on a building drum. These lengths of tread rubber, after extrusion, pass through a liquid bath which brings them to a uniform temperature and physical condition and they are cut to the proper length and placed side by side in a row on a drying conveyor that brings the lengths of tread stock to the tread applying drum station. This conveyor usually runs in a horizontal plane at the tire building machine. Situated substantially tangent to and above the tread applying building drum is the tread applying conveyor, which is disposed at an angle to the horizontal plane in order that the end of the conveyor remote from the building drum will clear the building drum at the next station. Lengths of tread stock must be transferred from the drying conveyor to the inclined applying conveyor after which the applying conveyor is operated to lay the stock tangentially on the building drum at its lower end as the drum is rotated, causing the tread strip to be wrapped around the carcass on the drum, there being stitching apparatus at the drum to press the stock against the carcass. If care is no taken in the handling of the tread stock during the transfer operation, distortion thereof is apt to occur, resulting in a light or a heavy spot in the finished tire which will cause the phenomenon known as "thump," and may cause other defects.

The apparatus of this invention includes a tread carrier support and a tread carrier pivoted on one end of the support. The tread carrier has two positions relative to its support, (1) a vertical position and (2) an inclined position. A pivotally mounted arm swings the tread carrier from a position overlying the drying conveyor to one overlying the tread applying conveyor. In operation, the arm is swung to place the carrier over the drying conveyor with the carrier disposed above a tread strip thereupon and with the carrier parallel to the tread strip. The carrier support is then vertically lowered to cause vacuum cups on the carrier to engage the tread strip. The carrier support is then raised to cause the tread to clear the drying conveyor, and the arm is swung to a position wherein the carrier support is disposed lengthwise along the applying conveyor. The tread carrier is then angularly shifted to its inclined position rendering it parallel to the tread applying conveyor. The tread carrier support is then vertically lowered to place the tread on the applying conveyor and the vacuum is released. The tread carrier is then restored to its horizontal position and it is also lifted to its vertically uppermost position, whereupon the arm is swung back to the drying conveyor to receive the next tread band. In the meantime, the tread applying conveyor is activated, along with the building drum, to wrap the tread strip to the carcass on the drum.

The manner in which this invention may be practiced will be apparent to those skilled in the art from the following detailed description of a preferred embodiment thereof:

Fig. 4 is a side view of the head structure;

Fig. 5 is a plan view of the head structure;

Fig. 6 is a section on 6—6 of Fig. 1;

Fig. 7 is a vertical section of a vacuum pick up head;

Fig. 8 is a section of the head on 8—8 of Fig. 7;

Fig. 9 is a side view of the tread applying conveyor; and

Fig. 10 is a plan view of the lower end of the stop device for tread applying conveyor, with other parts removed.

Figure 1:
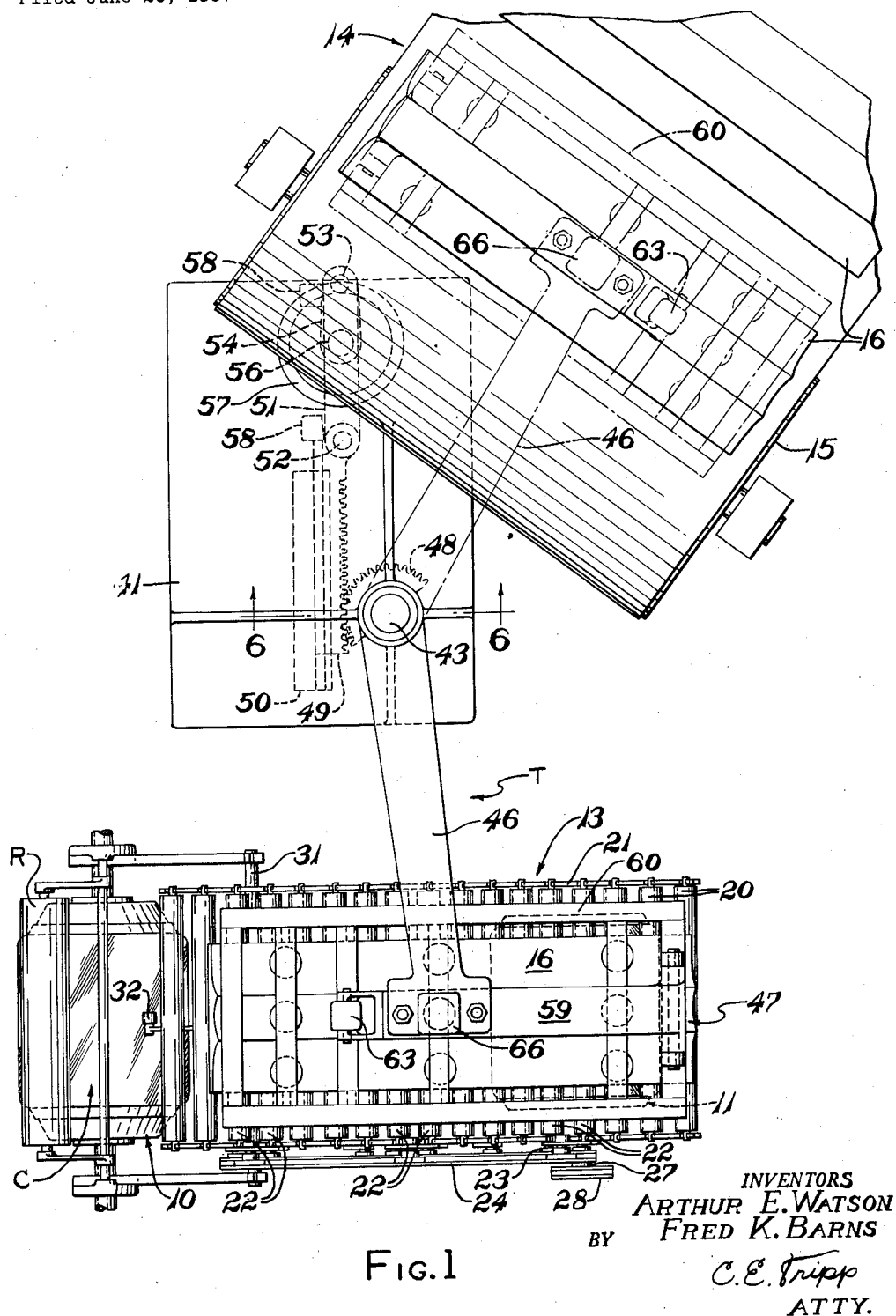
Fig. 1 is a general plan view of part of an automatic tire building machine showing a station adjacent the apparatus of this invention.
Figure 2:
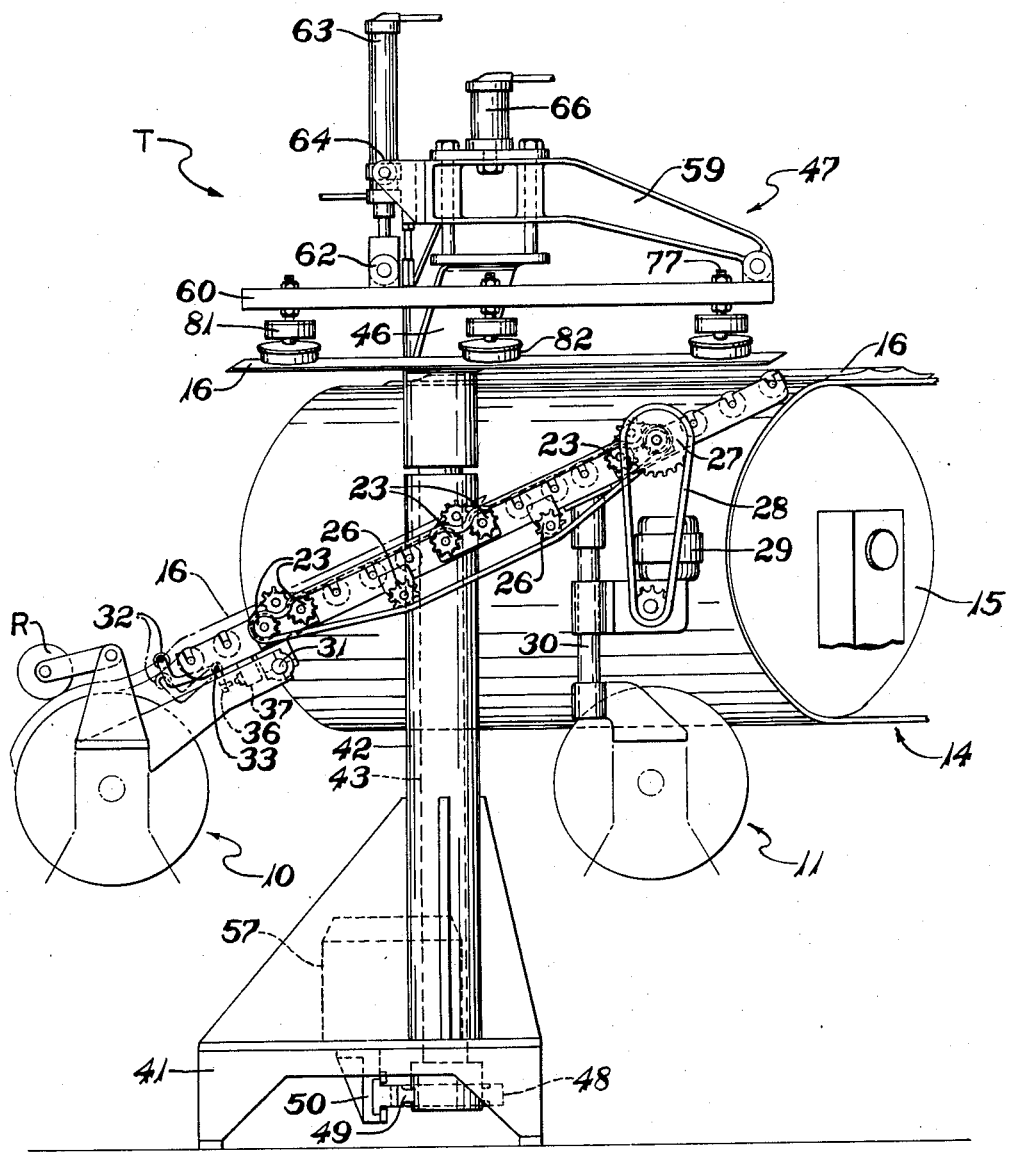
Fig. 2 is a side view of the transfer unit positioned over the tread applying conveyor.
Figure 3:
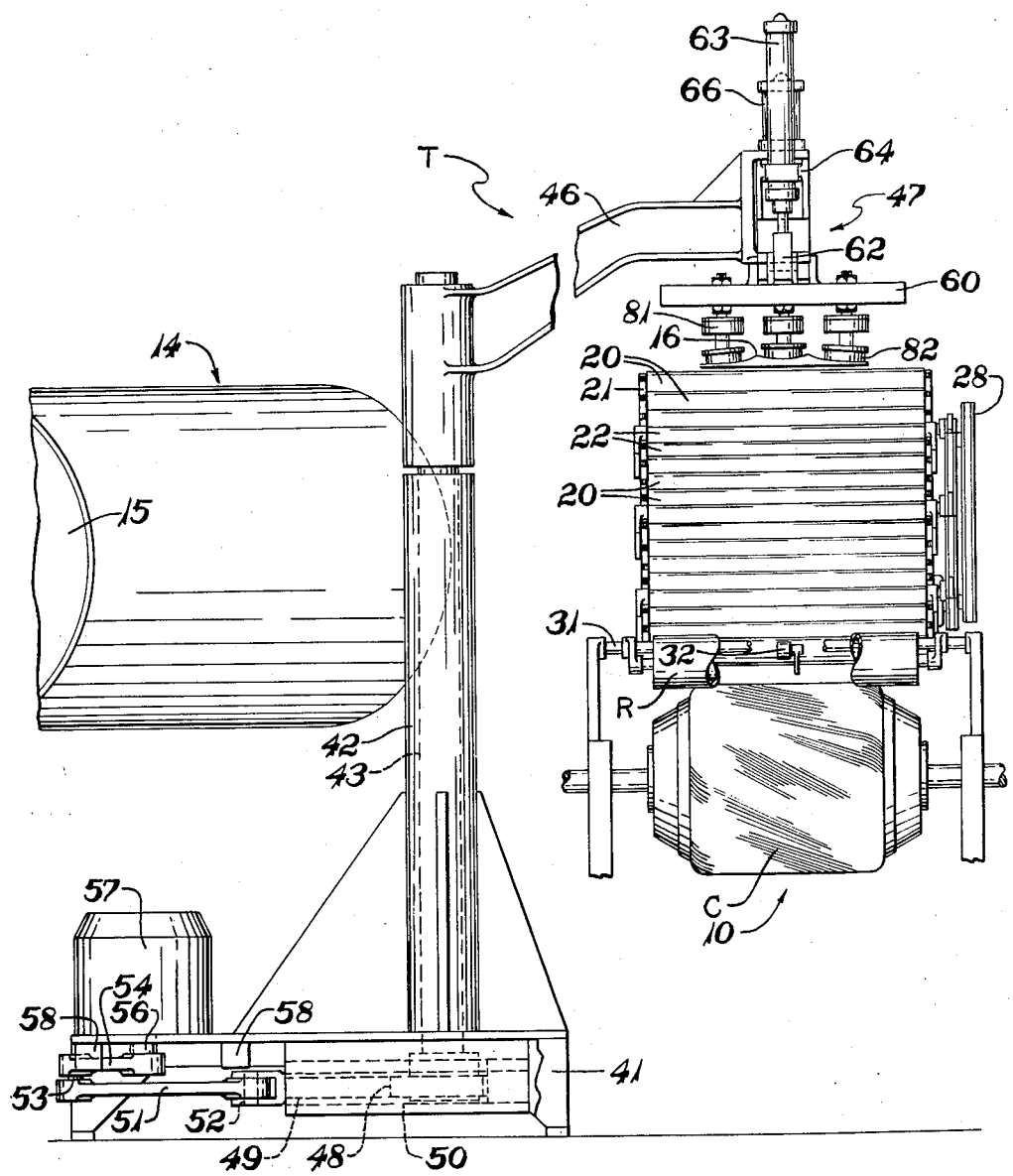
Fig. 3 is a front view of the unit in the same position.

Referring to Fig. 1, the transfer device T is shown positioned at a station to station type of automatic tire building machine. The machine has a tread applying station 10 that follows a series of stations and is followed by other stations 11, etc. Building drums are transferred from station to station by mechanism not shown and which forms no part of the invention, and different operations are performed at each station. The aforesaid patent U.S. 2,319,643 shows suitable drum transfer means.

Disposed above stations 10 and 11 is a tread applying conveyor 13 which extends downwardly from its rearward portion, where it clears station 11, its forward portion being substantially tangent to the drum at station 10. This conveyor is driven intermittently in properly timed relationship to operation of the other units.

Leading to the tread applying station 10 is a drying or delivery conveyor 14 having a terminal drum 15. Tread strips 16 of extruded, unvulcanized stock are disposed crosswise on the conveyor belt and reach the building machine travelling in a horizontal plane. This conveyor is also driven intermittently in the proper cycle relative to other units of the system.

Certain details of the tread applying conveyor 13 will be described for better understanding of the operation of the transfer device T, it being understood that the detailed construction of the conveyor itself forms no part of the invention. The conveying surface of the applying conveyor is formed by dead rollers 20 mounted in the inclined frame 21, and driven, or live rollers 22, are driven by sprockets 23 and chain 24, sprockets 26 being guide sprockets. The rearward driven roller is driven by sprocket 27, chain 28 and motor 29. The conveyor is supported by a pedestal 30 at its rearward end and by rods 31 at its forward end. When a tread strip 16 is placed on the applying conveyor by the transfer unit, motor 29 is started and the tread advanced until it depresses a stop roller 32, as seen in Fig. 10. This turns cross rod 33, Fig. 9, against counterweight 34 causing finger 36 to actuate a switch 37 and stop the conveyor drive.

When the drum at station 10 is ready for application of the tread, the applying conveyor is started by a circuit that overrides switch 37 and moves the tread at the peripheral speed of the rotating drum so that the tread is deposited on the drum without distortion. The tread bridges the small gap between the stop roller and the drum and is thereupon carried around the drum due to the synchronous motion of drum and conveyor, plus the tack of the tread and carcass plies C previously applied to the drum at other stations. Stitching roller R is pressed against the tread as the drum rotates. When the end of the tread clears roller 32, the conveyor is stopped. Details of the electric relays and switches are not part of the invention, and such circuits represent routine circuit design.

Figs. 2–10 show details of a transfer unit embodying the invention, which unit is mounted adjacent the two conveyors and building station 10, as seen in Fig. 1. The unit has a base 41 from which extends a vertical sleeve 42 that rotatably supports a columnar shaft 43 by upper and lower bearings 44, Fig. 6. Fixed to the upper end of shaft 43 is a cantilever arm 46 that mounts the tread carrier assembly 47. The arm 46 is swung from a position wherein the assembly 47 is positioned crosswise over the drying conveyor to a position in alignment with the tread applying conveyor (an arc of 143° on the form shown) by mechanism in the base, Figs. 1 and 6.

A sector gear 48 is keyed to the lower end of vertical shaft 43 and is oscillated from one position to another by a horizontal rack 49, mounted in a suitable guide assembly 50 best seen in Figs. 1 and 6. The rack 49 is given sinusoidal rectilinear motion to give smooth starting and stopping of arm 46 by a rotary hydraulic motor 57 and a crank assembly. A connecting rod or link 51 is pivoted at one end to the rack by pin 52 and at the other end to a pin 53 clamped in a crank 54. The crank is keyed to the shaft 56 of the vane type hydraulic motor 57 that imparts 180° rotation to crank 54 between a pair of stops 58. As seen in Fig. 1, the crank 54, connecting rod 51 and rack 49 are all aligned at the extremes of the 180° rotation of the vane in the motor 57 (not shown) such motors being standard commercially sold units. This linkage provides slow starting of arm 46, rapid intermediate motion, and slow stopping of the arm which reduces inertia forces and smooths the operation of the unit. The diameter of sector gear 48 is selected relative to the length of crank 54 to give the desired angular motion of arm 46, about 143° in the arrangement shown.

The operation of arm 46 and the tread pick up assembly 47 is an important feature of the invention. The pick up assembly has two motions relative to the arm and its support. One motion is vertical, that is, parallel to the shaft 43, which motion permits the assembly to be raised by a fluid motor to clear a tread band or a conveyor and lowered to engage a tread band or deposit it on a conveyor. To accomplish this, fluid motor 66 (see Fig. 4) is mounted on arm 46 and has its piston rod 67 attached to carrier support member 59 of the pickup assembly. The end of arm 46 is forked and includes vertical guide rods 68 extending through holes 69 in the pickup assembly for slidably supporting the pickup assembly. The pickup assembly is arranged to slide vertically on rods 68 between upper and lower positions in response to the operation of pressure cylinder motor 66. The other motion is an angular motion of the tread carrier to its support arm and permits the pick up assembly to be made parallel to either the horizontal conveyor or the inclined conveyor. This motion is also caused by an air motor.

The pickup assembly includes a cantilever beam-like member 59 which is slidably engaged with vertical rods 68 and which supports a rectangular tread carrier frame 60 pivoted to member 59 by pins 61 fastened to the outboard end of the member. The other end of carrier frame 60 is supported by a pin and clevis arrangement 62 that connects to the piston of a fluid air motor 63, the cylinder of motor 63 being pivotally mounted on the end of the carrier support member 59 remote from pivot connection 61 by a pivot pin and pillow block assembly 64. This arrangement permits fluid motor 63 to pivot the carrier frame 60 from one angular position to another without binding of the parts. A stop 65 is adjustably mounted on carrier support member 59 to insure that carrier frame 60 will assume a position parallel to the drying conveyor at the end of the up stroke of fluid air motor 63.

Figs. 7 and 8 show means for mounting and adjusting the vacuum heads. Fastened to a flange on each stud 77 is a plate 78 screwed to a spider 79 having a centrally apertured web 81. To provide angular adjustment of the vacuum pick up lip 82, a bolt 83 is provided with a spherical head 83a that is frictionally pressed against the edge of the aperture in web 81 by a spring 84. The lower end of bolt 83 is threaded into a backing plate 86 that is recessed at 87 to receive the mounting flange of the soft rubber vacuum sealing and pick up member 82. A vacuum connection 88 is provided through plate 86 to the interior of the head, spider 79 being notched to receive the vacuum connection. The desired angular adjustment of pick up member 82 is maintained by three jack screws 89 adjustably threaded in spider 79 with their heads pressing against plate 86.

*Operation*

As mentioned, the control valves and electrical circuits that may be provided to provide the properly timed cyclic operation of the entire apparatus described are not shown, these being matters of routine design and in fact manual operation of such controls could be provided if speed of operation were not required, thus merely the preferred sequence of steps in the operation need be described and any mechanic skilled in the control field could provide apparatus that would start and stop the various units in the desired sequence and under the timing requirements of the tire building machine proper.

Starting at the drying conveyor 14, assume that the conveyor has advanced to bring a tread strip 16 in the pick up position and has stopped. The transfer unit will be operated to swing the arm 46 to position the carrier assembly 47 over the tread strip. The controls of tilt motor 63 will have been operated to pivot carrier frame 60 to its horizontal position and the controls of the vertical positioning fluid motor 66 will have been operated to raise the carrier assembly 47 to its uppermost vertical position. When the arm has placed the pick up frame over the tread strip as described, the controls of fluid motor 66 will be operated to lower the carrier assembly, including horizontally disposed carrier frame 60, to bring the rubber cups or lips 82 against the surface of the tread strip. As seen, Fig. 3, the angular adjustment of the vacuum pick up heads permits them to match the underlying contour of the tread strip. Air will then be exhausted from the vacuum heads and fluid motor 66 will again be actuated to raise the carrier assembly 47 to cause the tread to clear the conveyor. The controls for motor 57 that swings the transfer arm 46 will now be actuated to cause the motor crank and connecting rod to retract the rack to the position shown, solid lines in Fig. 1, thus swinging the carrier assembly 47 from its position over the drying conveyor to a position wherein the carrier frame lies over the tread applying conveyor 13.

Fluid motor 63 will now be actuated to tilt the carrier frame 60 so that it is parallel to the tread applying conveyor, and fluid motor 66 will be actuated to lower the carrier assembly and tread to bring the tread strip in the plane of the conveyor rollers. The vacuum will then be released, the carrier assembly will be raised and carrier frame 60 will be pivoted up to its horizontal position leaving the tread strip on the tread applying conveyor. The tread applying conveyor will now be started bringing the tread strip to the stop roller on the conveyor, ready for application to a tire carcass. As soon as a building drum having a carcass thereon has been transferred to station 10, the tread applying conveyor will be re-started and the building drum will start turning by actuation of suitable control, applying the tread to the tire carcass as previously described. The tread applying conveyor will then be stopped and the drying conveyor will have been started and stopped to bring another tread strip under the pickup head of the transfer unit, which will have been positioned over the drying conveyor to receive the tread.

The unit will transfer treads without distorting or stretching them and will not damage the treads during pickup, transfer and set down. The unit is easily adjustable for various tread strip lengths, widths, and contours, and can be precisely aligned with conveyors in different planes. The unit adapts itself to synchronized automatic operation with an automatic tire building machine.

Having completed a detailed description of a preferred embodiment of the invention so that others skilled in the art may practice the same, we claim:

1. Automatic tire building apparatus comprising a row of tire building drums adapted to be rotatably mounted on horizontal axes, said drums being aligned in a direction perpendicular to their axes, a tread applying conveyor disposed above and parallel to said row of drums, said conveyor extending from a position adjacent one end that is substantially above one of the drums to a position at the other end that is substantially tangent to another drum for applying a tread strip placed lengthwise on said conveyor to a tire carcass carried by said other drum, a tread strip delivery conveyor to one side of said row of drums and extending angularly toward said other drum and conveyor, said delivery conveyor having tread strips disposed crosswise thereon, a tread strip transfer device disposed adjacent to said conveyors, said device comprising a tread strip carrier support above said conveyors, an elongated tread strip carrier having an end remote from said other drum pivotably mounted on said support, vacuum tread pickup means on the underside of said tread strip carrier, means to move said tread strip carrier support and said carrier from one position wherein said tread strip carrier is aligned with a tread strip crosswise of said delivery conveyor to another position wherein said tread strip carrier is aligned with said tread applying conveyor in its direction of motion toward said other drum, and means to move said tread strip carrier to a position parallel to the upper surface of said delivery conveyor when the carrier is disposed over the delivery conveyor and to an angular position parallel to the upper surface of said applying conveyor when the carrier is disposed above the latter.

2. Apparatus for transferring a rubber tire tread strip from one conveyor running horizontally to another conveyor running at an angle to the horizontal and whose paths of motion intersect at an acute angle as measured in the horizontal plane, comprising a tread strip carrier support, an elongated tread strip carrier, means mounting said tread strip carrier on said carrier support for independent angular motion relative to said support in the vertical plane, means to both rotate and translate said tread strip carrier support transverse to said conveyor in a horizontal plane to position said tread strip carrier selectively at a predetermined stopped position over either conveyor, said translating means including mechanism for gradually decelerating said carrier support as the carrier approaches each of its predetermined stopped positions and means to move said tread strip carrier angularly relative to its support in said vertical plane to selectively position the tread strip carrier parallel to either underlying conveyor.

3. The apparatus of claim 2 including means to independently move said tread strip carrier support vertically relative to its mounting means to lift a tread strip from one of said conveyors and deposit it on the other of said conveyors.

4. Apparatus for transferring rubber tire tread strip from one conveyor running horizontally to another conveyor running at an angle to the horizontal and whose paths of motion intersect at an acute angle as measured in the horizontal plane, comprising an arm pivotally mounted adjacent said conveyors for motion about a vertical axis, a tread strip carrier support on the end of said arm, a tread strip carrier mounted on said carrier support for independent motion relative to said carrier support in the vertical plane, means for pivoting said arm on said vertical axis to swing said tread strip carrier translationally to a predetermined position over either conveyor, said pivoting means for said arm including mechanism for gradually accelerating the translation motion of said carrier away from its stopped position over one conveyor and then gradually decelerating the translational motion to the predetermined stopped position over the other conveyor, and means to move said other end of said tread strip carrier vertically to selectively make the tread strip carrier parallel to either underlying conveyor.

5. The apparatus of claim 4 including means to move said tread strip carrier support vertically on said arm to lift the tread strip from one conveyor and deposit it on the other conveyor.

6. The apparatus of claim 4 including vacuum tread strip pickup means on the underside of said strip carrier.

7. In a tire building apparatus, a tire building drum, a tread-applying conveyor disposed substantially tangentially of said drum, means for delivering tread strips to a location adjoining the drum out of alignment with said conveyor, a tread strip transfer mechanism for transferring a tread strip from said delivery means onto said tread applying conveyor into a position of alignment therewith for application to the tire-building drum, said transfer mechanism including a tread strip carrier support, a tread strip carrier mounted on said support for movement relative to said support for selectively disposing said carrier parallel to said tread strips on the delivery means and parallel to said conveyor, vacuum cups on the tread-engaging side of said carrier arranged to engage and to conform substantially to the contour of the tread strip, means mounting said carrier support for movement transverse to said conveyor between two predetermined positions to translate said tread strip carrier selectively to a predetermined position overlying a tread strip on said delivery means and to a predetermined position overlying said tread-applying conveyor, and means to move said carrier support between said predetermined positions, the last said means including mechanism for gradually decelerating the motion of said carrier support as the support approaches each of its aforesaid predetermined positions.

References Cited in the file of this patent

UNITED STATES PATENTS

| 2,061,358 | Hunter et al. | Nov. 17, 1936 |
| 2,685,971 | Ewing et al. | Aug. 10, 1954 |
| 2,698,097 | Magnani | Dec. 28, 1954 |